(12) United States Patent
Katada

(10) Patent No.: US 9,369,565 B2
(45) Date of Patent: Jun. 14, 2016

(54) ELECTRONIC DEVICE

(75) Inventor: Jun Katada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/401,459

(22) PCT Filed: Jul. 12, 2012

(86) PCT No.: PCT/JP2012/067796
§ 371 (c)(1),
(2), (4) Date: Nov. 14, 2014

(87) PCT Pub. No.: WO2014/010054
PCT Pub. Date: Jan. 16, 2014

(65) Prior Publication Data
US 2015/0304476 A1   Oct. 22, 2015

(51) Int. Cl.
*H04M 1/725*  (2006.01)
*H04W 84/12*  (2009.01)
*H04W 88/02*  (2009.01)
*H04W 88/08*  (2009.01)

(52) U.S. Cl.
CPC ........ *H04M 1/7253* (2013.01); *H04M 2250/02* (2013.01); *H04W 84/12* (2013.01); *H04W 88/02* (2013.01); *H04W 88/08* (2013.01)

(58) Field of Classification Search
CPC .................. H04M 2250/02; H04M 1/7253
USPC ................................................. 455/41.1–41.3
See application file for complete search history.

(56) References Cited

U.S. PATENT DOCUMENTS

| | | | |
|---|---|---|---|
| 7,502,341 B2 * | 3/2009 | Matoba et al. | 370/319 |
| 7,620,372 B2 | 11/2009 | Miyazaki | |
| 8,176,194 B2 | 5/2012 | Saito et al. | |
| 8,179,856 B2 * | 5/2012 | Kamata et al. | 370/330 |
| 2011/0250920 A1 | 10/2011 | Shimizu et al. | |

FOREIGN PATENT DOCUMENTS

| | | |
|---|---|---|
| JP | 2004-72535 A | 3/2004 |
| JP | 2005-27026 A | 1/2005 |
| JP | 2005-142860 A | 6/2005 |
| JP | 2006-94005 A | 4/2006 |
| JP | 2006-121624 A | 5/2006 |
| JP | 2006-352799 A | 12/2006 |
| JP | 2010-68406 A | 3/2010 |
| JP | 2010-93591 A | 4/2010 |
| WO | WO 2010/041412 A1 | 4/2010 |

* cited by examiner

*Primary Examiner* — Tuan H Nguyen
(74) *Attorney, Agent, or Firm* — Birch, Stewart, Kolasch & Birch, LLP

(57) ABSTRACT

An object of the present invention is to provide an electronic device which can output audio without sound skipping and can connect to the Internet. An electronic device according to the present invention includes: communication units that communicate with an outside by predetermined communication systems including a Bluetooth (registered trademark) communication; and a communication controller that controls to communicate with the outside by any of the predetermined communication systems, wherein the communication controller secures in advance an audio-dedicated band in a frequency band used in the Bluetooth communication.

6 Claims, 3 Drawing Sheets

ELECTRONIC DEVICE

TECHNICAL FIELD

The present invention relates to an electronic device which can output audio by a Bluetooth (registered trademark) communication, in particular, to an electronic device in which, even when the electronic device is connected to the Internet, the audio is not interrupted while being output.

BACKGROUND ART

The band (frequency band) available in the Bluetooth communication is limited to 2.4 GHz. For example, there is a problem that, in the case that a terminal having a function to output audio by the Bluetooth communication is outputting audio by using an audio profile for the Bluetooth communication, if a profile other than the audio profile is used, the possibility of the audio being interrupted (hereinafter, referred to as "sound skipping") while being output becomes higher. Here, the term "audio" includes music and other sounds.

In order to address the above problem, there is conventionally disclosed a technology in which sound skipping is prevented by storing and playing back audio data and thereby limiting the data packet of music streaming data, on a time axis (for example, refer to Patent Document 1).

Further, there is disclosed a technology in which sound skipping is prevented by, in the case that an audio profile is used, prohibiting use of other profile itself which handles a large amount of information (for example, refer to Patent Document 2).

In addition, there is disclosed a technology in which wireless communication means is chosen depending on a load (process content) of a process under execution (for example, refer to Patent Document 3).

PRIOR ART DOCUMENTS

Patent Documents

Patent Document 1: Japanese Patent Application Laid-Open No. 2010-068406
Patent Document 2: Japanese Patent Application Laid-Open No. 2006-121624
Patent Document 3: Japanese Patent Application Laid-Open No. 2005-027026

SUMMARY OF INVENTION

Problems to be Solved by the Invention

According to Patent Document 1, music may not be played back in real time. In addition, Patent Document 1 does not describe anything about an Internet connection, and when an Internet connection is performed, sound skipping may occur.

Further, according to Patent Document 2, when the amount of information needed for an Internet connection is large, the Internet connection itself shall be prohibited, whereby it is impossible to perform the Internet connection while outputting audio.

Further, according to Patent Document 3, a type of wireless communication means depends on the process content; however, if the bandwidth for outputting audio becomes insufficient to output audio, sound skipping may occur.

The present invention has been made to solve these problems, and an object of the present invention is to provide an electronic device which can output audio without sound skipping and can connect to the Internet.

Means for Solving the Problems

An electronic device according to the present invention includes: a communication unit that communicates with an outside by predetermined communication systems including a Bluetooth (registered trademark) communication; and a communication controller that controls to communicate with the outside by any of the predetermined communication systems, wherein the communication controller secures in advance an audio-dedicated band in a frequency band used in the Bluetooth communication.

Effects of the Invention

According to the present invention, there are equipped with a communication unit that communicates with an outside by predetermined communication systems including a Bluetooth (registered trademark) communication, and a communication controller that controls to communicate with the outside by any of the predetermined communication systems, wherein the communication controller secures in advance an audio-dedicated band in a frequency band used in the Bluetooth communication; thus, it is possible to output audio without sound skipping and to connect to the Internet.

An object, a feature, an aspect, and an advantage of the present invention will be more obvious by the following detailed description and the accompanying drawings.

DESCRIPTION OF EMBODIMENT

An embodiment of he present invention will be described below, based on the drawings.
<Embodiment>
FIG. 1 a diagram showing an example of a configuration of communication means equipped in an electronic device 1 of an embodiment of the present invention.

The electronic device 1 according to the present embodiment has various types of communication means such as a Bluetooth communication, a Wireless LAN (WLAN) communication, and a USB tethering.

For example, the electronic device 1 can connect to an access point by a WLAN communication and connect to the Internet through the access point.

In addition, the electronic device 1 can USB connect to a USB device and connect to the Internet by using the USB device as an access point.

Further, the electronic device 1 can connect to each of a music playback device, a mobile phone, and a data communication device by a Bluetooth communication.

Specifically, the music playback device can be connected by Advanced Audio Distribution Profile (A2DP) or Audio/Video Remote Control Profile (AVRCP) of the Bluetooth communication.

Further, the mobile phone can be connected by Hands-Free Profile (HFP), Phone Book Access Profile (PBAP), Message Access Profile (MAP), A2DP, AVRCP, Object Push Profile (OPP), Dial-UP Network Profile (DUN), or Personal Area Networking Profile (PAN).

Further, the data communication device can be also connected by DUN or PAN.

Figure 1:
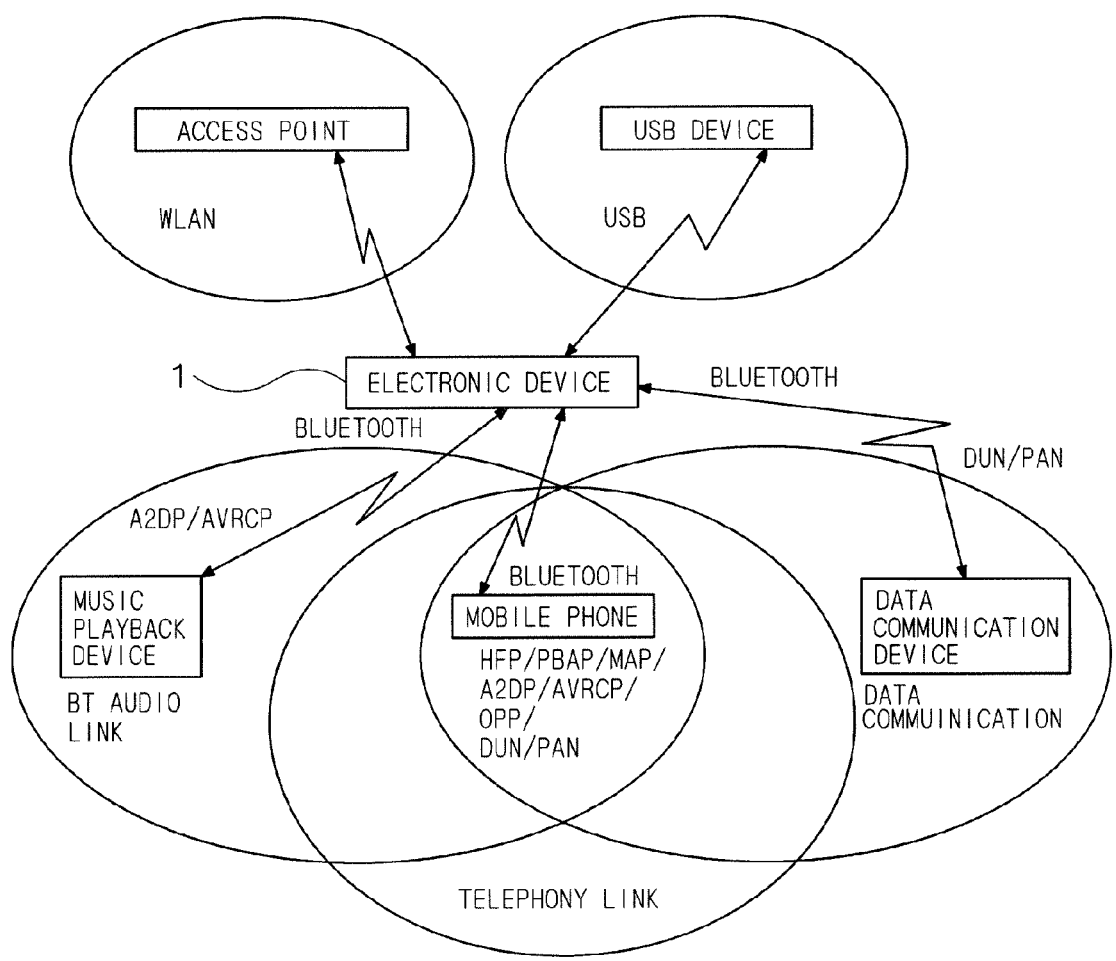
FIG. 1 is a diagram showing an example of a configuration of communication means equipped in an electronic device of an embodiment of the present invention.

Of the networks configured with the above Bluetooth communication, in FIG. 1, the network related to the playback of music is referred to as Bluetooth (BT) Audio Link, the network related to a telephone call is referred to as Telephony Link, and the network related to data communication is referred to as Data communication.

Although the electronic device 1 has various types of communication means, the user cannot see which type of communication means is the most effective. Further, in some cases, user does not know that the electronic device 1 has a function to switch the types of communication means. Thus, it is beneficial to the user that such a switching function is performed without making the user aware of it (in other words, switching to effective communication means is performed without user's operations).

Next, a configuration of the electronic device according to the present embodiment will be described.

Figure 2:
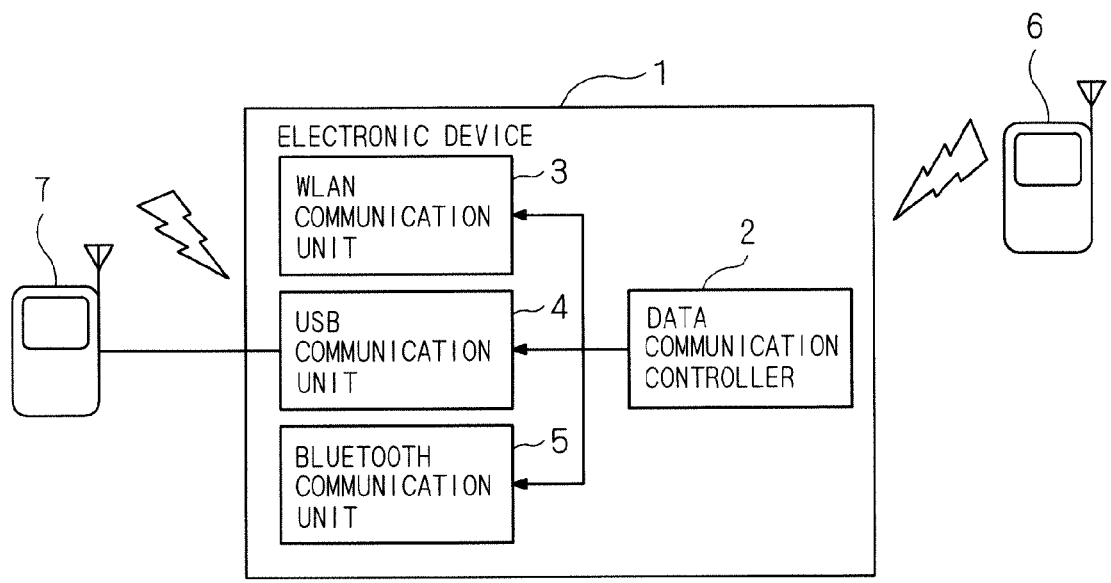
FIG. 2 is a diagram showing an example of a configuration of the electronic device of the embodiment of the present invention.

FIG. 2 is a diagram showing an example of the configuration of the electronic device 1 according to the present embodiment.

The electronic device 1 according to the present embodiment is equipped with a WLAN communication unit 3 capable of communication connection to an outside by a WLAN communication, a USB communication unit 4 capable of communication connection to an outside through a communication terminal 7 by USB tethering, and a Bluetooth communication unit 5 capable of communication connection to an outside by Bluetooth communication. In other words, the WLAN communication unit 3, the USB communication unit 4, and the Bluetooth communication unit 5 can communicate with the outside by predetermined communication systems (Bluetooth communication, WLAN communication, and USB tethering). Note that in the present embodiment, an Internet connection will be particularly described as an example of the communication connection to the outside. Further, the communication terminal 7 has an Internet connection function.

The electronic device 1 is further equipped with a data communication controller 2 (communication controller) which controls such that an Internet connection (communication) to the outside is performed by any of the predetermined communication systems (Bluetooth communication, WLAN communication, and USB tethering).

Further, the electronic device 1 can also connect to a communication terminal 6 by the Bluetooth communication. The communication terminal 6 is capable of the Bluetooth communication and has a function to play audio.

The data communication controller 2 previously secures a band dedicated to audio (hereinafter, referred to as an "audio-dedicated band") in a frequency band used in the Bluetooth communication. Specifically, the audio-dedicated band is previously secured by setting a threshold to the band (2.4 GHz) which is available in the Bluetooth communication with the communication terminal 6. By securing the audio-dedicated band, the communication terminal 6 can play audio without sound skipping.

With the above configuration, the electronic device 1 can automatically switch, when the user uses the Internet, to the communication means most effective for the Internet connection (to be described later), whereby the Internet connection can be performed while preventing sound skipping of audio.

Next, an operation of the electronic device according to the present embodiment will be described.

Figure 3:
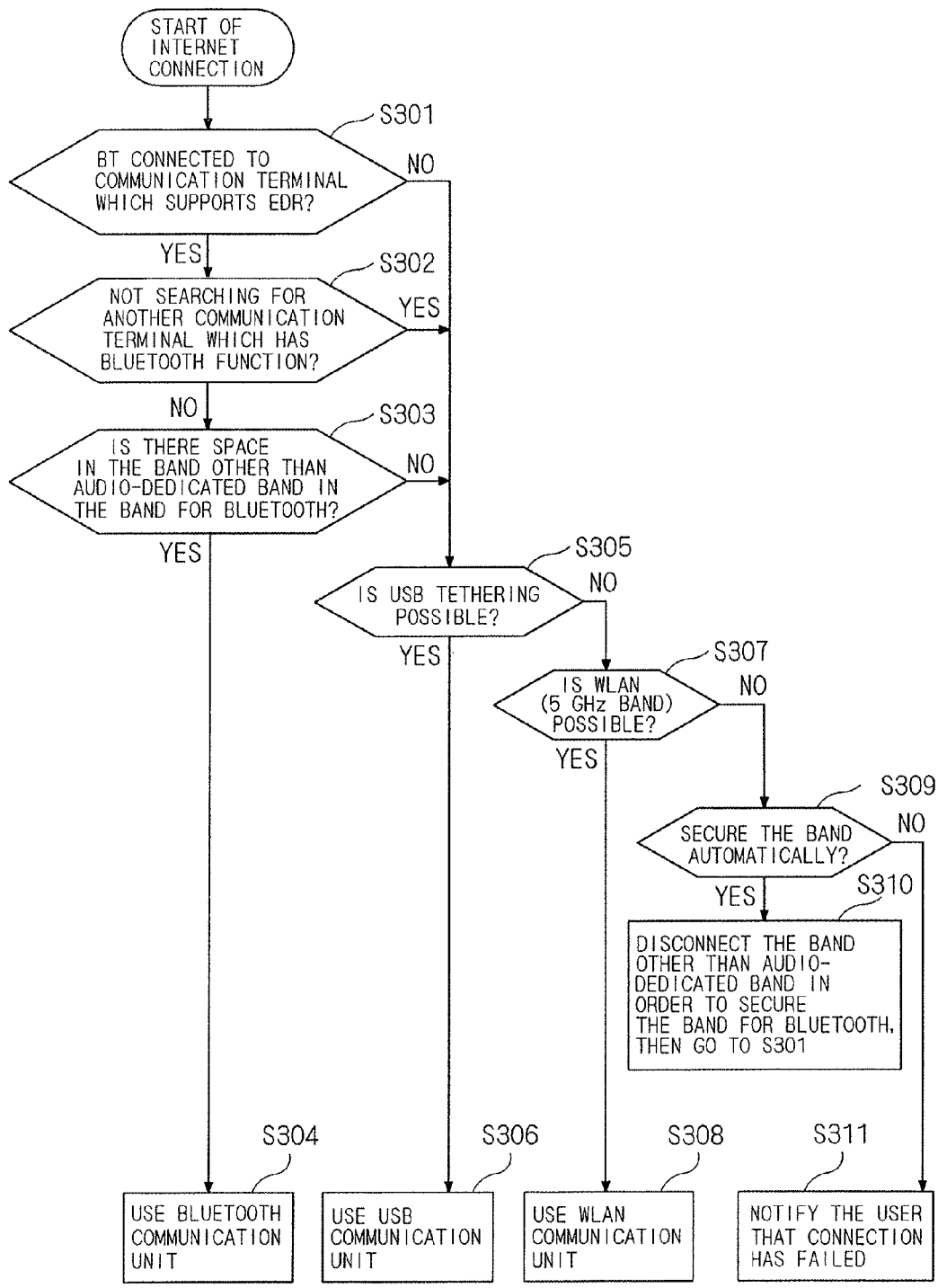
FIG. 3 is a diagram showing an example of an operation of the electronic device of the embodiment of the present invention.

FIG. 3 is a diagram showing an example of an operation of the electronic device 1 according to the present embodiment. As a precondition to perform the operation shown in FIG. 3, the audio-dedicated band for the Bluetooth communication is previously secured. The operation shown in FIG. 3 is performed by the data communication controller 2.

In step S301, it is determined whether the electronic device 1 is currently connected to a communication terminal which is compatible with (supports) Enhanced Data Rate (EDR), by a Bluetooth (BT) communication. If it is determined that the electronic device 1 is currently connected, the process goes to step S302; and it is determined that the electronic device 1 is not currently connected, the process goes to step S305. Here, as the case that the electronic device 1 is not currently connected, there is a case in which the electronic device 1 is not connected to the communication terminal compatible with EDR by the Bluetooth communication or there is a case in which the electronic device 1 is connected by the Bluetooth communication but the communication terminal is not compatible with EDR. In these cases, the Internet connection will not be performed by the Bluetooth communication. In addition, the determination whether the communication terminal is compatible with EDR is made, after an Asynchronous Connection-Less (ACL) link connection is established to the communication terminal by the Bluetooth communication, depending on whether Multi-slot data of ACL packet data exist.

In step S302, it is determined whether another communication terminal having a Bluetooth communication function is not being searched for. If it is determined that the search is not being performed, the process goes to step S303; and if it is determined that the search is being performed, the process goes to step S305. When another communication terminal is being searched for, the band used in the Bluetooth communication is used for the searching. Thus, in such a case, the Internet connection will not be performed by the Bluetooth communication.

In step S303, it is determined whether there is a space in a band other than the audio-dedicated band in a frequency band used in the Bluetooth communication. If it is determined that there is a space, the process goes to step S304; and if it is determined that there is no space, the process goes to step S305. Here, the determination whether there is a space in the band depends on whether there is a sufficient space in the band for connection to the Internet. Further, because the audio-dedicated band has been previously secured in the present embodiment, it is not necessary to determine whether an A2DP connection has been established.

In step S304, the Internet connection is performed by the Bluetooth communication unit 5 by using DUN or PAN of the Bluetooth communication.

In step S305, it is determined whether USB tethering is possible. If it is determined that the USB tethering is possible, the process goes to step S306; and if it is determined that the USB tethering is not possible (impossible), the process goes to step S307.

In step S306, the Internet connection is performed by the USB communication unit 4 by using the USB tethering.

In step S307, it is determined whether a WLAN (5 GHz band) communication is possible. If it is determined that the WLAN communication is possible, the process goes to step S308; and if it is determined that the WLAN communication is not possible (impossible), the process goes to step S309.

Here, the WLAN communication can use the 2.4 GHz band and the 5 GHz band according to the IEEE802.11 standard; however, because the 2.4 GHz band is the same as the band used in the Bluetooth communication, the 5 GHz band is used in the present embodiment.

In step S308, the Internet connection is performed by the WLAN communication unit 3 by using the WLAN communication.

In step S309, it is determined whether or not to secure band automatically. If it is determined to secure the band, the process goes to step S310; and if it is determined not to secure the band, the process goes to step S311. That is to say, in the case that the Internet connection is impossible by the predetermined communication systems (Bluetooth communication, USB tethering, and WLAN communication), the band other than the audio-dedicated band in the frequency band used in the Bluetooth communication is cleared. Here, the expression "the band is secured" means to automatically disconnect (make unusable) the band other than the audio-dedicated band. In the present embodiment, the setting is made to be "Secure Band Automatically," and the user does not have to specify effective communication means by himself or herself when establishing the Internet connection. Accordingly, the burden on the user can be reduced.

In step S310, in order to secure the band to be used in the Bluetooth communication, the band other than the audio-dedicated band is disconnected, and the process goes to step S301.

In step S311, it is notified to the user that the Internet connection has failed.

Note that also in the case that, after the process goes from step S310 to step S301, the Internet connection is not established by any of the Bluetooth communication unit 5, the USB communication unit 4, and the WLAN communication unit 3 (step S307: NO), it is not determined whether or not to secure the band automatically (step S309: NO), and it is notified to the user that the Internet connection has failed.

With the above arrangement, if the Internet connection cannot be performed by the Bluetooth communication, the data communication controller 2 connects to the Internet by another of the predetermined communication systems (USB tethering and WLAN communication). The case that the Internet connection cannot be performed by the Bluetooth communication is at least one of the cases: when a communication terminal in the outside is not compatible with EDR; when the Bluetooth communication unit 5 is connected to the communication terminal compatible with EDR and is searching for another communication terminal; and when there is no space in a band other than the audio-dedicated band in the frequency band used in the Bluetooth communication.

From the above description, with the present embodiment, the audio-dedicated band is previously secured in the frequency band used in the Bluetooth communication, and when the Internet is used, it is possible to automatically switch to communication means which is effective for the Internet connection; thus, the user can play audio (for example, play music) without sound skipping and enjoy the Internet.

Note that the electronic device according to the present embodiment can be applied to any device capable of playback of audio and Internet connection such as a car navigation device, an audio device, and an AVN (Audio Visual Navigation) having a car navigation function and an audio function.

Further, the WLAN communication unit 3 and the USB communication unit 4 according to the present embodiment can be applied even to connections other than the Internet connection.

Further, in the present embodiment, the WLAN communication unit 3, the USB communication unit 4, and the Bluetooth communication unit 5 are described as examples; however, any communication means can be used as long as it is communication means for connecting to the Internet.

Further, an example of the communication terminal 7 includes a mobile phone, but any device can be used as long as the Internet can be used with it.

Further, an example of the communication terminal 6 includes a portable audio player, but any device can be used as long as audio can be played through at least a Bluetooth communication.

Further, a communication terminal which is compatible with (supports) Enhanced Data Rate (EDR) may be communication terminals 6 and 7, if the terminal has a Bluetooth communication function and an Internet connection function.

Further, in the present embodiment, the audio-dedicated band is constantly secured whether or not the audio-dedicated band is used; however, instead of this arrangement, the audio-dedicated band may be preferentially secured when the bandwidth is insufficient, for example. In other words, the band only has to be secured when audio is output.

Further, in FIG. 3, in the present embodiment, the setting of "Secure Band Automatically" is a default setting, but the setting can be set by the user (for example, the user can set "Not Secure Band Automatically").

Note that, in the present invention, the embodiment can be appropriately modified or omitted without departing from the scope of the present invention.

The present invention has been described in detail; however the above description is just an example in all aspects, and the present invention is not limited thereto. Countless modified examples which have not been illustrated by an example can be considered without departing from the scope of the present invention.

DESCRIPTION OF THE NUMERALS

1: Electronic device
2: Data communication controller
3: WLAN communication unit
4: USB communication unit
5: Bluetooth communication unit
6, 7: Communication terminal

The invention claimed is:
1. An electronic device comprising:
a communication unit that communicates with an outside by predetermined communication systems including BLUETOOTH communications; and
a communication controller that controls communications with said outside by establishing a connection for said communications using a selected one of said predetermined communication systems,
wherein said communication controller secures in advance an audio-dedicated band within a frequency band used in said BLUETOOTH communications such that said connection is established so as not to include said audio-dedicated band, and
wherein said securing in advance of said audio-dedicated band ensures a capability of said device to play audio via said BLUETOOTH communications using said audio-dedicated band while concurrently conducting said communications with said outside via said connection under both of the following circumstances: (1) the selected one of said predetermined communication systems is said BLUETOOTH communications, and (2) the selected one of said predetermined communication systems is different from said BLUETOOTH communications.

2. The electronic device according to claim 1, wherein said connection is an Internet connection, and said communication controller establishes said Internet connection by any of said predetermined communication systems.

3. The electronic device according to claim 2, wherein when said Internet connection cannot be established by said BLUETOOTH communications, said communication controller establishes said Internet connection by another of said predetermined communication systems other than said BLUETOOTH communications.

4. The electronic device according to claim 3, wherein a case in which said Internet connection cannot be established by said BLUETOOTH communications is at least one of cases: when a communication terminal in said outside is not compatible with Enhanced Data Rate (EDR); when said communication unit is connected to said communication terminal compatible with said EDR and is searching for another of said communication terminal with a BLUETOOTH function; and when there is no space in a band other than said audio-dedicated band in said frequency band used in said BLUETOOTH communications.

5. The electronic device according to claim 3, wherein when said Internet connection cannot be established by said another predetermined communication system, said communication controller clears a band other than said audio-dedicated band in said frequency band used in said BLUETOOTH communications.

6. The electronic device according to claim 1, wherein said predetermined communication systems include a WLAN communication and a USB tethering.

* * * * *